(12) United States Patent
Langlais et al.

(10) Patent No.: US 7,135,115 B2
(45) Date of Patent: Nov. 14, 2006

(54) MEMBRANE BIOREACTOR WASTE WATER TREATMENT METHOD

(75) Inventors: Chrystelle Langlais, Le Pecq (FR); Michel Cordier, Nanterre (FR)

(73) Assignee: Degremont, Rueil Malmaison (FR)

( * ) Notice: Subject to any disclaimer, the term of this patent is extended or adjusted under 35 U.S.C. 154(b) by 0 days.

(21) Appl. No.: 10/528,797

(22) PCT Filed: Sep. 23, 2003

(86) PCT No.: PCT/FR03/02796

§ 371 (c)(1),
(2), (4) Date: Mar. 23, 2005

(87) PCT Pub. No.: WO2004/028986

PCT Pub. Date: Apr. 8, 2004

(65) Prior Publication Data

US 2006/0037909 A1   Feb. 23, 2006

(30) Foreign Application Priority Data

Sep. 24, 2002   (FR) ................................. 02 11788

(51) Int. Cl.
C02F 3/00 (2006.01)
(52) U.S. Cl. ...................... 210/609; 210/631
(58) Field of Classification Search ................ 210/609, 210/631, 732–736
See application file for complete search history.

(56) References Cited

U.S. PATENT DOCUMENTS

| 1,999,973 A | 4/1935 | Genter |
| 5,087,378 A * | 2/1992 | Kovacs ........................ 210/742 |
| 6,872,312 B1 * | 3/2005 | Shah et al. .................. 210/609 |

FOREIGN PATENT DOCUMENTS

| DE | 44 01 705 A | 7/1995 |
| EP | 0 503 649 A | 9/1992 |
| JP | 07 265900 A | 10/1995 |
| JP | 11 057799 A | 3/1999 |
| WO | WO 98 49108 A | 11/1998 |

* cited by examiner

Primary Examiner—Chester T. Barry
(74) Attorney, Agent, or Firm—Connolly Bove Lodge & Hutz LLP

(57) ABSTRACT

A method for treating waste water uses a membrane bioreactor that produces excess biological sludge and treated water components. This is achieved by extracting the biological sludge from the bioreactor then causing contact between the biological sludge and dewatered effluent to form two resulting products. The first product contains polyelectrolyte loaded sludge. Polyelectrolyte is continually added to the polyelectrolyte loaded sludge during dewatering to separately form dewatered sludge and the dewatered effluent. This is followed by extracting, as a second product, polyelectrolyte free effluent. The polyelectrolyte free effluent is recycled to the bioreactor.

2 Claims, 2 Drawing Sheets

MEMBRANE BIOREACTOR WASTE WATER TREATMENT METHOD

FIELD OF THE INVENTION

The present invention relates to the treatment of waste water using membrane bioreactors.

BACKGROUND OF THE INVENTION

It is known that during such treatments, it is necessary to dewater the biological sludge from the reactor, this sludge previously undergoing a chemical conditioning to ensure its flocculation. Polymers and, more generally, polyelectrolytes are used for this conditioning, particularly in order to obtain bulky, well-differentiated flocs, in a clarified interstitial water. The liquid effluent from the dewatering operation is recycled to the head of the membrane bioreactor.

The return of this effluent to the head of the membrane bioreactor incurs a major risk due to the fact that this effluent, produced by the sludge dewatering operation, contains relatively large residual quantities of polyelectrolytes that are liable to cause severe, indeed irreversible, clogging of the bioreactor membranes.

During the treatment of waste water using a membrane bioreactor, the daily recycle rate at the head, that is of the liquid effluent from the dewatering operations, routinely represents 1 to 5% of the daily urban waste water feed rate and sometimes more than 10% of the daily rate when industrial waste water is treated.

When the sludge dewatering treatment and the recycling of the liquid effluent from this dewatering to the head of the bioreactor are carried out in batch mode, which is often the case, the proportion between the effluent from the dewatering and the waste water feed to the bioreactor may occasionally be much higher, thereby further aggravating the risk of clogging the membranes of the water treatment system, that is of the membrane bioreactor.

To overcome this drawback, two alternatives are proposed today by a person skilled in the art:
1) Avoid the risk of clogging. In this case, the recycling of the liquid effluent to the head is prohibited. The treatment of the sludge from the membrane bioreactor is then transferred to a nearby conventional station. In fact, it is not systematically possible to install such a sludge treatment station near the waste water treatment station and, in any case, this solution implies the transport of volumes of sludge that may be difficult to accept if the station is large.
2) Control the risk:
   a) by minimizing the quantity (that is the batching) of polyelectrolytes used for conditioning the sludge subjected to the dewatering treatment, by making sure to reintroduce the recycled liquid effluent from the sludge dewatering treatment to the head of the bioreactor, at the point furthest from the bioreactor membranes, and to spread these recyclings to the head over time, in order to guarantee the greatest possible dilution with the waste water fed to the membrane bioreactor. This may in particular result in the need to provide a buffer tank temporarily storing the effluent before its recycling to the head.
      This alternative can help to manage the risk of clogging the bioreactor membranes, but it does not eliminate the risk of an accidental overbatching of the polyelectrolytes during the sludge treatment. It is especially difficult to control such a risk because the quantitative analysis of the residual polyelectrolytes present in the head recyclings is technically complex, indeed impossible today.
   b) by subjecting the effluents from the sludge dewatering treatment to a pretreatment in order to destroy the residual quantities of polyelectrolytes. However, this solution presents the drawback of being very costly because the removal of a few milligrams per liter of residual quantities of polyelectrolytes usually involves the at least partial removal of the pollution from the effluent produced by sludge dewatering. Thus, for example, an oxidation treatment by ozone, of the residual quantities of polyelectrolytes, implies a very large and uneconomic batching due to the ozone demand of the effluent (oxidation of organic matter). More generally, the oxidizing treatments carried out on such effluents can also give rise to oxidation by-products that are difficult to remove by the water system if the latter is not designed to treat this type of induced pollution.

Finally, in the absence of a genuine "physical barrier", the pretreatments proposed for the time being do not guarantee the total elimination of the risk of clogging the membranes of the water treatment system.

On the assumption that these membranes are seriously clogged by the polyelectrolyte, a person skilled in the art can apply chemical washing procedures to restore the performance of the membranes. However, the effectiveness of these procedures is haphazard and the chemicals they employ are aggressive to the membranes, jeopardizing their service life. Furthermore, these procedures involve costly large-scale maintenance and the immobilization of a portion of the membrane area that is then no longer available for waste water filtration. This drawback results in the need to oversize the membrane filtration portion.

BRIEF DESCRIPTION OF THE INVENTION

It is therefore an object of the present invention to permit the recycling, to the head of the water system of a membrane bioreactor waste water treatment installation, of the effluent from the sludge system, that is from the dewatering step of the excess sludge produced by the water system, while completely eliminating the risk of clogging the membranes of the water system by the residual polyelectrolytes from the sludge system.

In consequence, this invention relates to a method for treating waste water by a membrane bioreactor comprising a sludge dewatering step and a recycling, to the head of the bioreactor, of the liquid effluent from the sludge dewatering, characterized in that:
   the biological sludge extracted from the bioreactor is contacted with the liquid effluent from the sludge dewatering step, so that the residual content, in said effluent, of polyelectrolyte used to condition the sludge during the dewatering step moves toward the biological sludge;
   the biological sludge is separated from the liquid effluent so as to produce a polyelectrolyte-free liquid effluent, on the one hand, and a polyelectrolyte-loaded biological sludge, on the other hand;
   the polyelectrolyte-free liquid effluent is recycled to the head of the membrane bioreactor and,
   the polyelectrolyte-loaded biological sludge is sent to the dewatering step.

According to the present invention, the biological sludge is separated from the liquid effluent by filtration on microfiltration or ultrafiltration membranes. By selecting a cutoff threshold that is significantly lower than the molecular weight of the polyelectrolytes used during the sludge dewatering, the membranes of the sludge system act as a genuine physical barrier and produce an effluent free of traces of polyelectrolytes, which can be recycled to the water system, that is to the head of the bioreactor, without the risk of clogging the membranes thereof, the polyelectrolyte-loaded biological sludge or flocs being sent to the sludge dewatering step.

Other features and advantages of the present invention will appear from the description given below with reference to the drawings appended hereto, which illustrate a non-limiting embodiment thereof. In the drawings:

DETAILED DESCRIPTION OF THE INVENTION

Figure 1:
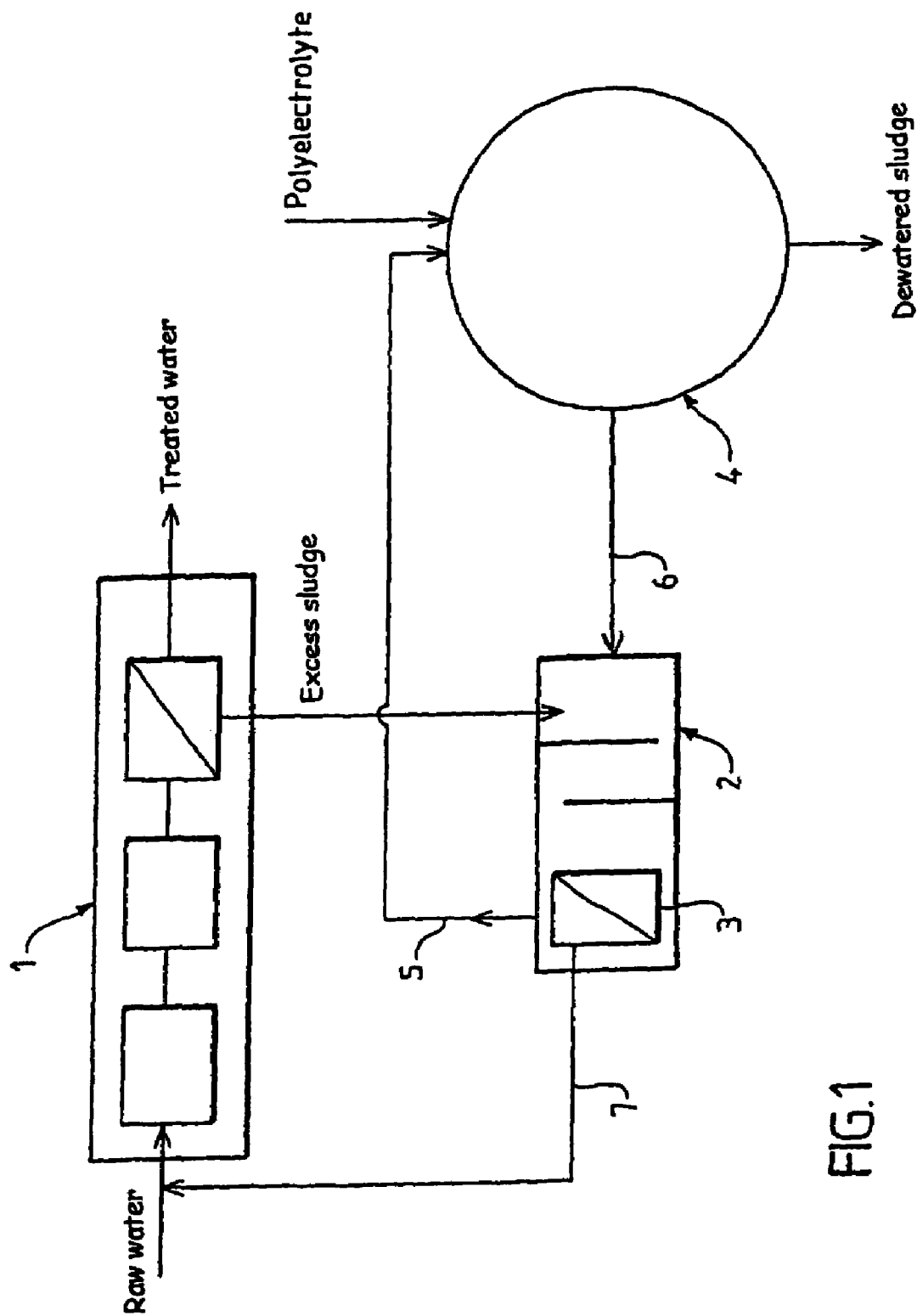
FIG. 1 is a diagrammatic view of an installation employing the method according to the present invention.

FIG. 1 shows at 1 the water system for treating urban or industrial waste water, this system comprising a membrane bioreactor. This installation comprises a dewatering unit for the sludge produced by the water system, designated as a whole by the numeral 4, with a polyelectrolyte injection for conditioning the sludge, this unit producing dewatered sludge, on the one hand, and a dewatering effluent removed via a line 6, on the other hand.

The excess sludge from the water system is contacted with the dewatering effluent conveyed via the line 6, in a contactor 2. During this contact, the residual quantity of polyelectrolyte in the dewatering effluent moves from the liquid phase to the biological flocs or sludge produced by the water system, by adsorption, absorption and flocculation mechanisms at levels very far from saturation. The polyelectrolyte fixation efficiency is close to 100%.

Thus the method according to the present invention permits the intimate contacting of a large quantity of excess biological sludge extracted from the membrane bioreactor (concentration about 8 to 12 g/l) with a small quantity of residual polyelectrolyte present in the dewatering effluent. The polyelectrolyte losses in the dewatering unit 4 may represent nearly 10% of the initial batching, indeed more in case of overbatching.

The contactor 2 may be, for example, a "TURBACTOR" rapid mixing reactor as described in Memento Technique de l'Eau, volume 2, page 638 published by Degremont (50$^{th}$ anniversary edition 1989).

The biological sludge is then separated from the liquid phase by filtration in order to produce a polyelectrolyte-free liquid effluent, recycled to the head of the water system via a line 7, and a polyelectrolyte-loaded biological sludge which is conveyed to the dewatering unit 4 via the line 5. As mentioned above, this separation can be carried out by filtration on microfiltration or ultrafiltration membranes, acting as a physical barrier in order to produce an effluent free of traces of polyelectrolyte. This effluent can therefore be recycled to the water system without the risk of clogging the membranes thereof. The membranes of the sludge system may have any geometry (plane, tubular, hollow fiber), may be made of any appropriate material (organic or ceramic) and may present any operating configuration (external system or immersed system).

Figure 2:
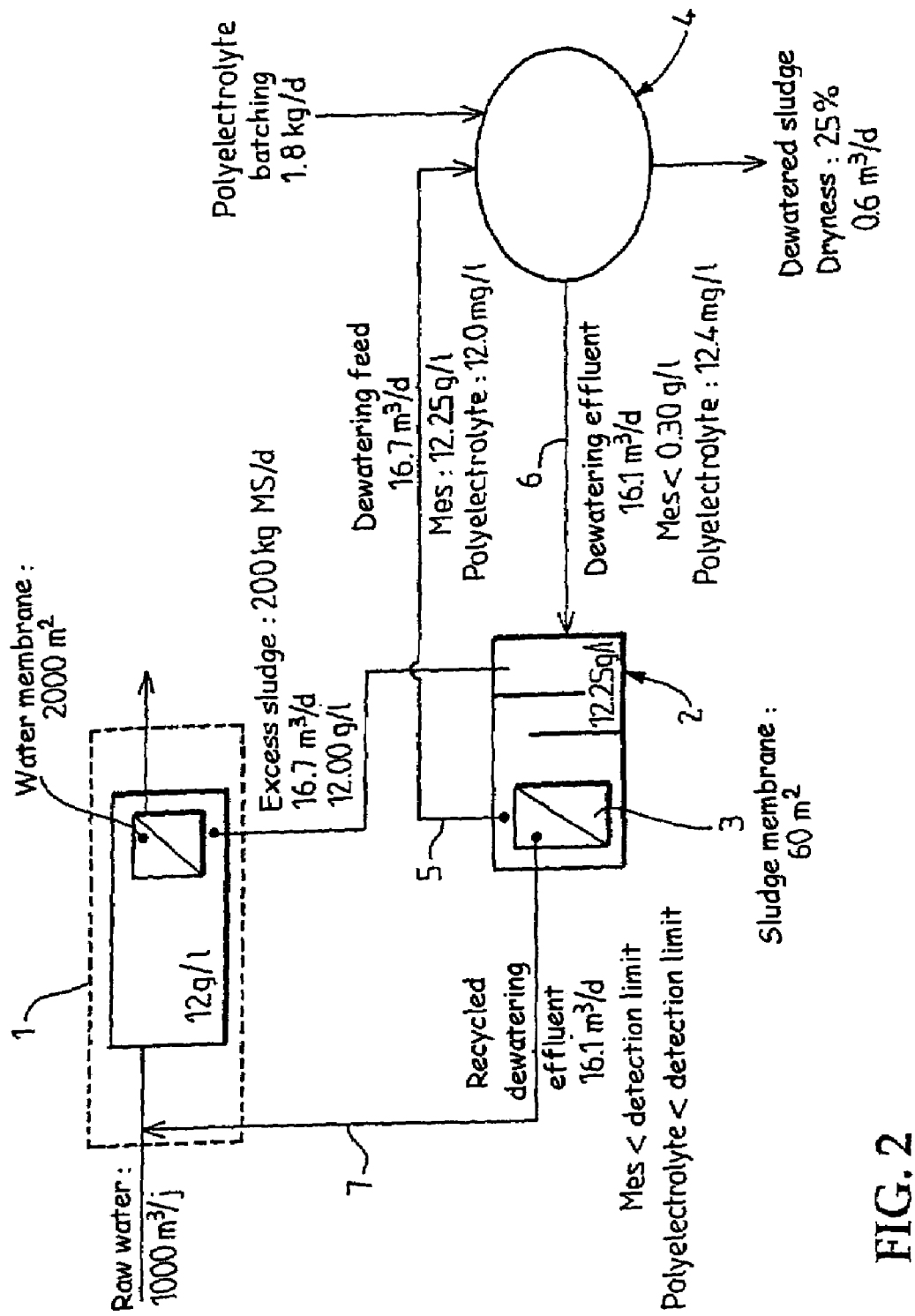
FIG. 2 is a similar view to FIG. 1, showing an embodiment of the method according to the invention.

FIG. 2 shows an embodiment of the method according to the invention. In this FIG. 2, the characteristic values of the installation used during this application and the data obtained are mentioned.

An examination of this figure shows that the "leakage" of polyelectrolyte in the sludge dewatering unit 4 represents 200 g/day. This residual polyelectrolyte is transferred, in the contactor 2, on 200 kg of biological sludge produced by the water system 1, representing a ratio of 1000.

The surface area of the membranes 3 (60 m$^2$) installed in the sludge system only accounts for 3% of the area of the membranes (2000 m$^2$) of the bioreactor of the water system. This means that the risk of accidentally clogging the membranes is limited to 3% of the total membrane area of the treatment installation. Furthermore, the dissociation of the membranes of the water system 1 and the membranes 3 of the sludge system serves to carry out a chemical washing of the membranes of the sludge system without reducing the filtration capacity of the water system. It is also possible to provide two sets of membranes on the sludge system (one in operation, the other in washing or on standby), considering the small surface area of the membranes of this sludge system; this is obviously impossible, for economic reasons, on the water system, because of the large surface area of the bioreactor membranes.

This figure shows that the dewatering effluent recycled to the head of the water system is free of polyelectrolyte, thereby eliminating any risk of clogging the membranes of the water system.

Furthermore, the invention serves to reduce the consumption of polyelectrolyte used for conditioning the sludge in the dewatering unit 4. In fact, the batching of polyelectrolyte necessary for dewatering the sludge produced by the water system is 10 kg/TMeS. The recycling of the "leaks" of polyelectrolyte to the dewatering unit (line 5) serves to reduce the consumption of polyelectrolyte by 10%, said consumption thereby being 1.8 kg/day instead of 2 kg/day.

The advantages provided by the present invention are in particular the following:

it serves to control the clogging character of the liquid effluents produced by the sludge dewatering step, by transferring a small quantity of polyelectrolyte to a large quantity of biological flocs (ratio 500 to 4000);

it guarantees the absence of residual traces of polyelectrolyte in the liquid effluent recycled to the head of the water system, thereby eliminating the risk of clogging the membranes of this system;

it serves to reduce the batching of polyelectrolyte during sludge dewatering thanks to the recycling of the leaks of polyelectrolyte on the sludge from the water system, before it is conditioned.

It remains obvious that the present invention is not limited to the embodiments described and shown above, but encompasses all variants thereof.

The invention claimed is:

1. A method for treating waste water by a membrane bioreactor comprising the steps:
   a) treating waste water in a bioreactor to produce excess biological sludge and treated water components;
   b) extracting the biological sludge from the bioreactor;
   c) causing contact between the biological sludge and dewatered effluent to form two resulting products;
   d) recycling a first product of the contacting biological sludge and dewatered effluent;

e) the first product containing polyelectrolyte loaded sludge;
f) continually adding polyelectrolyte to the polyelectrolyte loaded sludge during dewatering to separately form dewatered sludge and the dewatered effluent of step c);
g) extracting, as a second product of step c), polyelectrolyte free effluent;
h) recycling the polyelectrolyte free effluent to the bioreactor.

2. The method as claimed in claim 1, wherein the biological sludge is separated from the liquid effluent after being selectively subjected to microfiltration or ultrafiltration, the cutoff threshold of either being lower than the molecular weight of the polyelectrolytes used during dewatering.

* * * * *